(12) United States Patent
Tse et al.

(10) Patent No.: US 8,743,995 B2
(45) Date of Patent: Jun. 3, 2014

(54) WIRELESS COMMUNICATION THROUGHPUT ENHANCEMENT BASED ON DELAYED CHANNEL GAIN INFORMATION

(71) Applicant: The Regents of the University of California, Oakland, CA (US)

(72) Inventors: David Ngar Ching Tse, Berkeley, CA (US); Mohammad Ali Maddah-Ali, Piscataway, NJ (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/898,328

(22) Filed: May 20, 2013

(65) Prior Publication Data

US 2013/0301748 A1    Nov. 14, 2013

Related U.S. Application Data

(63) Continuation of application No. PCT/US2011/066228, filed on Dec. 20, 2011.

(60) Provisional application No. 61/425,136, filed on Dec. 20, 2010.

(51) Int. Cl.
*H04B 7/02*    (2006.01)

(52) U.S. Cl.
USPC ........................................................ 375/267

(58) Field of Classification Search
CPC .......... H04B 7/0413; H04L 1/00; H04L 1/02; H04L 1/0618
USPC ........................................................ 375/267
See application file for complete search history.

(56) References Cited

U.S. PATENT DOCUMENTS

| 7,289,574 | B2 * | 10/2007 | Parolari | 375/295 |
| 7,583,723 | B2 * | 9/2009 | Heikkila | 375/148 |
| 7,710,908 | B2 | 5/2010 | Larsson et al. | |
| 2006/0146965 | A1 * | 7/2006 | Kwun et al. | 375/341 |
| 2008/0081570 | A1 * | 4/2008 | Jeong et al. | 455/101 |
| 2008/0310556 | A1 * | 12/2008 | Lee et al. | 375/340 |

FOREIGN PATENT DOCUMENTS

| EP | 1 900 137 B2 | 1/2013 |
| WO | 2012/088142 A1 | 6/2012 |

OTHER PUBLICATIONS

Cadambe, "Interference alignment and degrees of freedom of the K-user interference channel," IEEE Transact ions on Information Theory, vol. 54, No. 8, pp. 3425-3441, Aug. 2008.*
Alamouti, "A simple transmit diversity technique for wireless Communications", IEEE Journal on Selected Areas in Communications, vol. 16, Issue 8, Oct. 1998 pp. 1451-1458.*
Korean Intellectual Property Office, International Search Report and Written Opinion, issued on May 20, 2012 for corresponding international patent application No. PCT/US2011/066228 (pp. 1-9) with claims searched (pp. 10-13) (pp. 1-13).
V.R. Cadambe, et al., "Interference alignment and degrees of freedom of 1-20 the K-user interference channel, " IEEE Transactions on Information Theory, vol. 54, No. 8, pp. 3425-3441, Aug. 2008.

* cited by examiner

*Primary Examiner* — Juan A Torres
(74) *Attorney, Agent, or Firm* — John P. O'Banion

(57) ABSTRACT

Channel gain information is utilized for determining linear, or non-linear, combinations of transmitted symbols to increase symbol throughput. The base station recombines symbols directed to different receivers in response to the channel gain information. Channel gain information, which is subject to delay, has been previously utilized merely for predicting current channel gains prior at the time of transmission. The present invention, however, utilizes the channel gain information to increase coding efficiency even when the channel gain information is not utilized for predicting current channel gains. The method, apparatus and systems of the invention are applicable to any configuration of multiple wireless transmission to multiple receivers.

20 Claims, 10 Drawing Sheets

WIRELESS COMMUNICATION THROUGHPUT ENHANCEMENT BASED ON DELAYED CHANNEL GAIN INFORMATION

CROSS-REFERENCE TO RELATED APPLICATIONS

This application is a 35 U.S.C. §111(a) continuation of PCT international application number PCT/US2011/066228 filed on Dec. 20, 2011, incorporated herein by reference in its entirety, which is a nonprovisional of U.S. provisional patent application Ser. No. 61/425,136 filed on Dec. 20, 2010, incorporated herein by reference in its entirety. Priority is claimed to each of the foregoing applications.

STATEMENT REGARDING FEDERALLY SPONSORED RESEARCH OR DEVELOPMENT

This invention was made with government support under Grant Number FA9550-09-1-0317 awarded by the Air Force Office of Scientific Research (AFOSR). The government has certain rights in the invention.

The above-referenced PCT international application was published as PCT International Publication No. WO 2012/088142 on Jun. 28, 2012, incorporated herein by reference in its entirety.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to wireless communication, and more particularly to increasing wireless throughput by exploiting channel gain information beyond mere prediction.

2. Description of Related Art

Wireless communications has become ubiquitous in our modern world, with ever expanding capabilities to communicate between parties in motion, such as via cell phones. Numerous standards have been developed for communicating wirelessly at faster rates, more securely, and over a wider range of conditions (robustness).

The use of multiple transmitters and receivers (e.g., Multiple Input, Multiple Output (MIMO), Space-Division Multiple Access (SDMA)), provided gains in speed and security while being more robust.

Toward enhancing these multiple transmit, multiple receiver, communication systems, information about channel gains have been utilized for predicting current channel gains at the time of transmission. It will be noted that the data from the transmitting node to the receiving node is sent through a time-varying channel, one for each receiving node, whereby information about the time-varying gains of the channels is assumed to be available at the transmitting node, yet only after a certain delay. This delay may be caused by the need for the channel gains of a receiving node, also referred to as a Mobile Station (MS) to be measured at that receiving node and then fed back to the transmitter, also referred to as a Base Station (BS) through the uplink, or for some other reasons. Due to the delay and the time-variation of the channel gains, the current channel gains may be different from the delayed channel measurements.

Many state-of-the-art approaches for dealing with the delay when predicting channel gains try to exploit the time correlation of the channel to predict the current channel gains from the delayed measurements. The predicted channel gains are then utilized in a scheme such as multiuser transmit beamforming (also called downlink multiuser MIMO or SDMA, space-division multiple access) which can simultaneously send data to the multiple receiving nodes. This is also called spatial multiplexing.

However, as the time-variation of the channel becomes faster, due to higher mobility for example, the delayed channel information reveals very little information about the current channel gains, and a prediction-based scheme may offer negligible multiplexing benefits.

Accordingly, there is a need for methods, apparatus and systems which enhance throughput despite the problems associated with channel gain delays. The present invention fulfills this need and others, and overcomes the shortcomings of prior multiple transmit, multiple receive configurations.

BRIEF SUMMARY OF THE INVENTION

The present invention is directed to the use of multiple transmit antennas at a transmitting node or a network of transmitting nodes to send data to multiple receiving nodes, each with one or more receive antennas. Each receiving node may be configured for either independent data or common data.

The present invention is directed to methods and apparatus for enhancing overall throughput in communication by exploiting the information about the channel gains of the various receiving nodes beyond mere channel gain predictions. The inventive method provides significant throughput increase even when the delayed channel gain information is not useful for prediction. The delayed channel gain information is used according to the present invention for determining combinations (linear or nonlinear) of the transmitted symbols from the transmit antennas that were received by the various receiving nodes in previous transmissions (under those channel gains). Based on this knowledge, the BS decides how to recombine the symbols intended for different users in the current transmission to aid all the Mobile Stations (MS's) to decode the data they need. The method may go through multiple stages of such recombinations. Overall data rate can be enhanced by a judicious choice of how the recombinations are determined at each stage. The key is to exploit at each stage the combinations that have been already received at the various receiving nodes in the previous stages so that the transmissions at the current stage can be designed to be simultaneously helpful to multiple receiving nodes.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

1. Introduction

The following describes several specific examples illustrating the basic concepts of the invention, followed by a more general description. To simplify the discussion, the transmitting node is referred to as a base station (BS) and each receiving node as a mobile station (MS) as appropriate, such as in the context of a cellular system. However, despite these references, it should be appreciated that the invention applies equally to other contexts where there is one or more transmitting nodes sending data to multiple receiving nodes over a broadcast medium, for instance peer-to-peer networks, multihop networks, adhoc networks, and similar situations.

1.1 Example 1

Two Transmit Antennas and Two Receiving Nodes

Figure 1A:
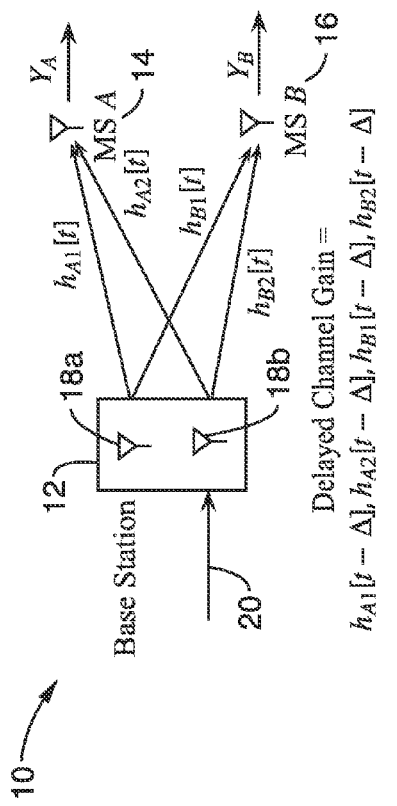
FIG. 1A and FIG. 1B are schematics of a Base Station (BS) or multiple Base Stations (BS's) and two Mobile Stations (MS's), showing that channel gain information is delayed by a given amount of time according to an embodiment of the present invention.
Figure 1B:
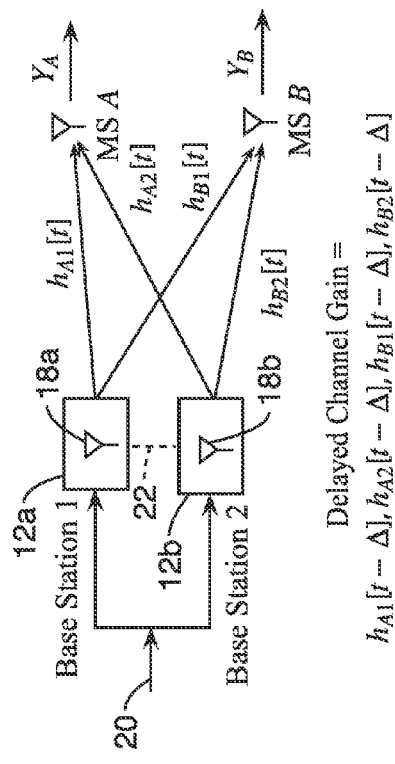

FIG. 1A through FIG. 1B illustrate example downlink embodiments 10 (represented by arrows) in a wireless communication system. As illustrated, the communications system includes at least one base station 12 which communicate with two mobile stations A 14 and B 16. It will be noted that the figure only depicts the downlink comprising the transmissions from BS to the MSs.

In FIG. 1A, the base station 12 is configured with two transmit antennas 18a, 18b for outputting data received in signal 20. The base station (BS) communicates with the mobile stations (MS's) in some surrounding geographic territory called a "cell" into which BS broadcasts. In this specific example, only two MS's A and B and two transmit antennas at the BS are referred to. However, the invention can be applied to any number K of receiving nodes to which the transmitting node is communicating and any number M of transmit antennas at the transmitting node.

Moreover, the transmit antennas do not have to be co-located at the same transmitting node. For example, the antennas may be on different transmitting nodes but their transmissions are coordinated through a link connecting the transmitting nodes or over-the-air between the transmitting nodes. In FIG. 1B there are two base stations 12a, 12b each with its own respective antenna 18a, 18b, shown receiving signal (symbol stream) 20 and coordinated by link 22.

There is a channel from each transmit antenna at the BS to each of the MSs. It should be appreciated that these channels may vary with respect to time due to movement of the MS and the movement in the scattering environment around the MS, and can be dependent on characteristics of the communication medium, including the frequency at which the BS communicates with the MSs associated with the channels. In this example, it is first assumed for the sake of simplicity that the transmitted symbol from each of the transmit antennas at the BS experiences a channel that has no inter-symbol interference. For example, the transmission may be on a single subcarrier of an Orthogonal Frequency Division Multiplex (OFDM) system. Each such channel from a transmit antenna to a MS can be represented by a single complex number (with real and imaginary parts) and is the so-called "base band representation" of the channel. This complex number is called the channel gain. In FIG. 1A, the channel gain from transmit antenna 1 and 2 to MS A at time t is represented by $h_{A1}[t]$ and $h_{A2}[t]$ respectively, and the channel from transmit antenna 1 and 2 to MS B at time t by $h_{A1}[t]$ and $h_{A2}[t]$, respectively. The received signal at an MS is the sum of the symbols transmitted at the different antennas multiplied by the corresponding channel gains. Here time t is "slotted", meaning that time is measured in terms of the number of symbols transmitted and thus time is indicated using positive integer values. Estimates of the channel gains are represented by $\hat{h}_{A1}[t], \hat{h}_{A2}[t], \hat{h}_{B1}[t], \hat{h}_{B2}[t]$, which are assumed in this invention to be obtained at the BS and MS's, after a certain delay.

The BS has data to send to MS A as well as data to send to MS B. During each time slot, the BS can transmit a symbol on each of the transmit antennas. A simple method for the BS to send information to the MS's is to use only one of its antennas and transmit one symbol to each MS at a time, alternating between the MS's. This results in a total system throughput of 1 symbol per time slot. This can be viewed as an orthogonal transmission method as the transmissions for the different MS's are never interfering.

In the above method, the BS does not use any current channel gain information to predict future channel gains when configuring its transmissions. If, on the other hand, channel gains are instantaneously known at the BS so that at time t, the gains at time t are all known by the BS, then instead of one symbol, two symbols can be transmitted simultaneously at each time slot, one for each MS. The conventional methods that accomplish this are called various names like downlink multiuser MIMO, space-division multiple access (SDMA) or downlink transmit beamforming. A simple example of such a method is zero-forcing transmit beamforming. Suppose symbol $u_A$ and symbol $u_B$ are to be transmitted to MS A and B respectively at time t. Then on transmit antenna 1, the BS transmits $$s_1[t]u_A h_{B2}[t] + u_B h_{A2}[t]$$

and on transmit antenna 2, the BS transmits $$s_2[t] = -u_A h_{B1}[t] - u_B h_{A1}[t].$$

The received signal at MS A is given by:

$$h_{A1}[t]s_1[t] + h_{A2}[t]s_2[t] = (h_{A1}[t]h_{B2}[t] - h_{A2}[t]h_{B1}[t])u_A$$

and the received signal at MS B is given by:

$$h_{B1}[t]s_1[t] + h_{B2}[t]s_2[t] = (h_{B1}[t]h_{A2}[t] - h_{B2}[t]h_{A1}[t])u_B.$$

Hence each MS can simultaneously decode its received symbols without interference from the symbols of the other MS. Using the knowledge of the channel gains, the transmission is designed to "zero-force" the interference so that the symbol for one MS does not appear at the receiver of the other MS.

The above ideal method assumes instantaneous knowledge of the channel gains at the BS. In practice, the channel gains are measured at a previous time. For example, in frequency-division duplex (FDD) systems, channel gains are measured at each MS such as using a pilot (inserted known symbols) in the downlink. The measured channel is then fed back to the BS. In a time-division duplex system, the uplink and the downlink channels are very similar, and the channel measurement is typically performed at the previous uplink time slot. In both cases, there is a certain amount of delay $\Delta$ from the time the channel is measured to the time when the current transmission has to be decided upon. The channel gain as shown in these figures is represented by $h_{A1}[t-\Delta], h_{A2}[t-\Delta], h_{B1}[t-\Delta], h_{B2}[t-\Delta]$. Since the channels are time-varying, the delayed channel measurements and the current channel gains may differ significantly. A standard approach is to use the channel measurements to predict the current channel gains. Using the predicted values of the channel gains, a method like the zero-forcing transmit beamforming is applied. However, in fast time-varying channels, prediction is difficult and these methods fail to achieve any gains.

The present invention aims to achieve improvements by exploiting the delayed channel gain measurements beyond using them merely for predicting current channel gains. In the context of this specific example, it will be shown that an embodiment of the present invention beneficially achieves a throughput of 4/3 symbols per time slot without even performing any channel prediction. In this example, it is assumed for the sake of simplicity that the delay in obtaining the channel gains is equal to the length of one time slot, although a generalization to an arbitrary level of delay is straightforward.

Figure 2:
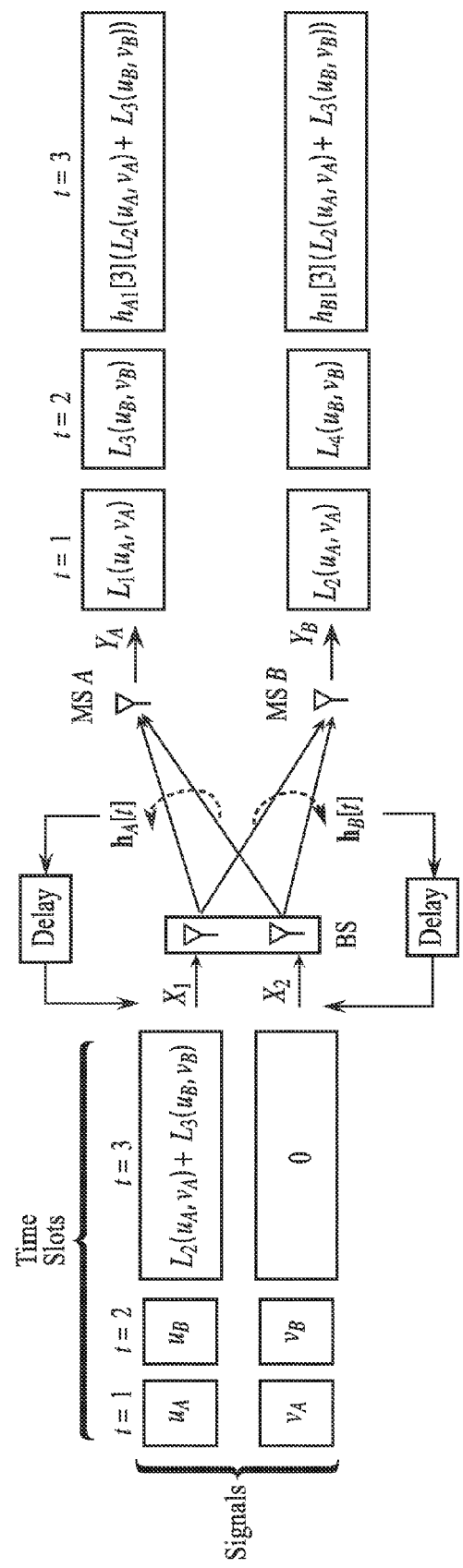
FIG. 2 is a schematic of a base station with two antennas communicating with two Mobile Stations (MS's) according to an embodiment of the present invention.

FIG. 2 illustrates an example embodiment of symbol sending within the time slots according to the invention. The configuration of transmitters and receivers is as shown in FIG. 1A, while also depicting the delay in determining channel gain. A symbol stream $X_1$ is transmitted by a first antenna, and symbol stream $X_2$ by a second antenna of a BS. MS A and MS B are shown with antennas for receiving respective signals $Y_A$ and $Y_B$. The channel gain information is represented at MS A with $h_A[t]$, and at MS B with $h_B[t]$, which is shown subject to a delay "Delay" prior to being fed into the symbol stream $X_1$ and $X_2$ respectively. The boxes extending horizontally at the transmit and receive sides of the schematic are marked with t=1, t=2 and t=3, showing the symbol information sent and received in the time slots over the communication system. Two symbols $u_A$ and $v_A$ are sent on the two transmit antennas in the first time slot. These symbols represent data for MS A. MS A receives a combination (linear):

$$L_1(u_A, v_A) = h_{A1}[1]u_A + h_{A2}[1]v_A,$$

of the two symbols. Thus, the received signal at MS A is a superposition of the signals from the two transmit antennas, each of which is multiplied by the respective channel gain from that transmit antenna. Similarly, MS B receives another linear combination:

$$L_2(u_A, v_A) = h_{B1}[1]u_A + h_{B2}[1]v_A.$$

Note that due to the broadcast nature of the wireless medium, the transmitted signal from the BS are seen at both MS's, although the symbols transmitted are intended only for MS A.

At time slot 2, two symbols $u_B, v_B$ are sent on transmit antenna 1 and 2 respectively. These two symbols are intended for MS B. MS A receives a linear combination $$L_3(u_B, v_B) = h_{A1}[2]u_B + h_{A2}[2]v_B$$

and MS B receives a linear combination $$L_4(u_B, v_B) = h_{B1}[2]u_B + h_{B2}[2]v_B.$$

It will be noted that so far no channel gain information has been utilized. The delayed information about the channel gains during the first two time transmissions is then utilized by the BS for constructing the transmission on the third time slot.

At the first time slot, MS A has already received $L_1$. Since the MS's are in different geographical locations, the channels of the two MS's are also different. Hence, $L_1, L_2$ are typically two different linear combinations of the transmitted symbols $u_A, v_A$. If MS A can somehow get $L_2$ as well, then it has two different linear combinations in the symbols $u_A$ and $v_A$ and that is sufficient for MS A to solve for its two symbols $u_A, v_A$. Similarly, at the second time slot, MS B already received $L_4$, so if MS B can somehow get $L_3$ as well, then it has two different linear combinations in the symbols $u_B$ and $v_B$ and that is sufficient for MS B to solve for its two symbols $u_B, v_B$. The BS accomplishes these two objectives simultaneously on the third time slot by using the first transmit antenna to send $L_2+L_3$. MS A receives $h_{A1}[3](L_2+L_3)$; since it already has $L_3$ from the second time slot, it can solve for $L_2$. Similarly, MS B receives $h_{B1}[3](L_2+L_3)$; since it already has $L_2$ from the first time slot, it can solve for $L_3$. Hence, based on the received signals in the three time slots, MS A can obtain its own data symbols $u_A, v_A$ and MS B can obtain its own data symbols $u_B, v_B$.

Delayed channel gain information is used in two ways: (1) Since $L_2$ depends on the channel gains of MS B at time slot 1, and $L_3$ depends on the channel gains of MS A at time slot 2, the BS uses this information for its transmission on time slot 3; (2) The MS's use the channel gains information to solve for their own data symbols.

The scenario has been kept very simple to describe the basic concepts in the simplest manner. In practice, however, a wide range of variations exist for using the techniques described herein. For example, the delay in getting the channel gains may be more than 1 symbol time slot. So if for example the delay is $\Delta$ symbol times, then the third transmission should take place $\neq$ or more symbol times after the first two transmissions. The time slots in between the first two transmissions and the third one can be used for communicating other data. There are no constraints on relative transmission times of the first two transmissions since delayed channel gain information was not used for these transmissions. These transmissions can be sent back-to-back or spaced apart as is convenient. In an OFDM system, the transmissions can even be transmitted at the same time on two different sub-carriers.

It will be noted that the received signal is often corrupted by additive noise and perhaps interference from other transmitters. Moreover, the delayed channel measurements can also be noisy. In this case, the symbols $u_A$, $u_B$, $v_A$, $v_B$ may be coded symbols rather than raw data symbols to combat the noise. Accordingly, $u_A$, $v_A$ may comprise portions of a codeword of an outer code for MS A, and $u_B$, $v_B$ are part of a codeword of an outer code for MS B. In this case, the method can be applied to all the coded symbols of the codewords. More specifically, it is supposed that $$(u_{A1}, v_{A1}, u_{A2}, v_{A2}, \ldots, u_{An}, v_{An})$$

is the codeword of length n for MS A, and $$(u_{B1}, v_{B1}, u_{B2}, v_{B2}, \ldots, u_{Bn}, v_{Bn})$$

is the codeword of length n for MS B. Then the above method is applied separately to $(u_{Ai}, v_{Ai}, u_{Bi}, v_{Bi})$ for each i, i=1, ... n. Each MS receives three transmissions for each i, for a total of 3n receptions. Based on these receptions, each MS can decode the transmitted codeword intended for it. In this method, for each i, the BS will transmit $L_{2i}+L_{3i}$ in the third transmission.

Figure 3:
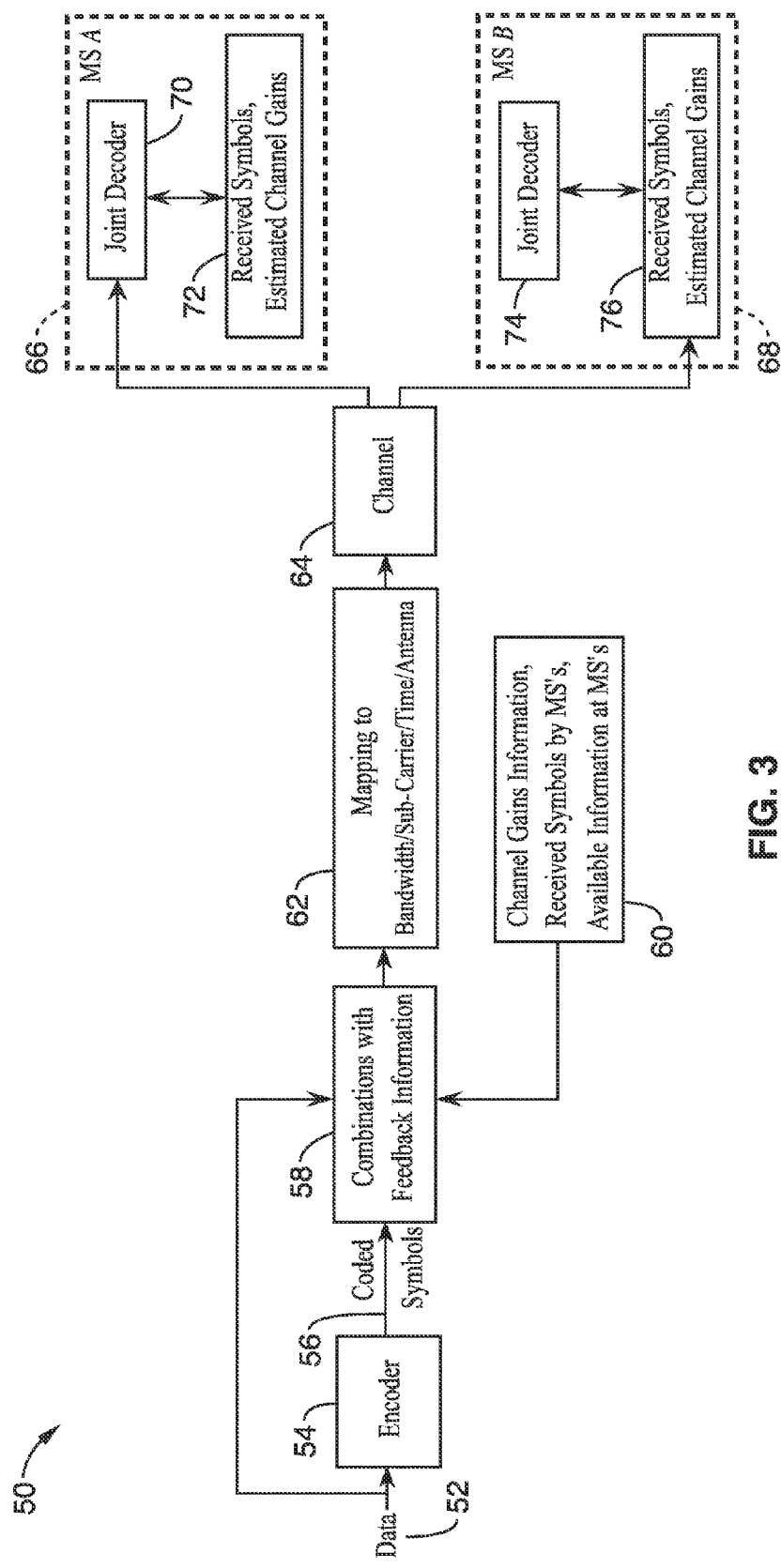
FIG. 3 is a block diagram of a coded system performing wireless communication according to an embodiment of the present invention.

FIG. 3 illustrates an embodiment 50 of a system of the invention utilizing coded symbols as described above. Data stream 52 is mapped by an encoder 54 into a stream of coded symbols 56. This is combined at block 58 with past channel gain information from block 60 and mapped to transmit symbols sent over bandwidth, subcarriers, time and antennas at block 62 which propagates across the channel as depicted in block 64. MS A 66 decodes its own data using joint decoder 70, jointly processing the received symbols and estimated channel gains in 72. Similarly, MS B 68 decodes its own data using joint decoder 74, jointly processing the received symbols and estimated channel gains in 76.

Further improvements can be obtained if the BS, instead of transmitting $L_{2i}+L_{3i}$ separately for each i, applies a code to the block:

$$(L_{21}+L_{31}, L_{22}+L_{32}, \ldots, L_{2n}+L_{3n})$$

so that each MS can first decode this entire block to obtain the $L_{2i}+L_{3i}$'s and then use that information to decode its data.

There are also many possible variations of the basic method described above. For example, instead of transmitting $L_2+L_3$ in the third time slot, there may be a transmit power constraint to be met. In this case, a scaled version $a(L_2+L_3)$ can be transmitted instead, with the number a chosen to meet the power constraint. Or more generally, an arbitrary linear combination $aL_2+bL_3$ can be transmitted instead, with the coefficients a and b optimized to maximize some metric, say the output signal-to-noise ratio after demodulation by the MS's. Or, if some channel prediction can be performed so that some knowledge of the current channel gains is known at the BS, then perhaps it is more beneficial to use both transmit antennas, each transmitting a potentially different linear combination of $L_2$, $L_3$.

The above variations are all transmitting linear combinations of $L_2$ and $L_3$. However, the goal of the third transmission in the above method is only to transmit something to both MS's so that MS A can decode $L_2$ knowing $L_3$ already and MS B can decode $L_3$ knowing $L_2$ already. It should be appreciated, however, that one can transmit a nonlinear function of $L_2$ and $L_3$ in the third transmission. In all cases, however, the underlying principle is the same: a function of $L_2$, $L_3$ is received at both MS's so that each MS can use its previously received information about the other user's symbols to help to obtain what it needs. For example, if $L_2$ and $L_3$ are between $-Q$ and $Q$, then in the third transmission, the base station can send $L_2+L_3$ mod $2Q$ to save energy.

As another example, the base station can compute $L_2$ and $L_3$ as functions of $L_2$ and $L_3$, and use them instead of $L_2$ and $L_3$. In this case, MS A and MS B may not be able to extract two interference free combinations of their symbols, but the overall signal-to-interference-plus-noise-ratio can be improved. The nonlinear functions can be selected such that one or more cost functions, such as average rate, or outage probability, are maximized. Techniques such as these can be applied to any of the methods described. This scheme can be combined with conventional schemes like zero-forcing precoding, dirty-paper precoding, and the like. As an example, the base station can be utilized to report channel gains to MS A and MS B to predict the current channel estimation. Then the base station can use conventional schemes like zero-forcing based on the predicted channel gain. On top of that it uses the proposed scheme based on residual and unpredictable channel information. Then the transmitted symbols would be a superposition of the symbols generated by conventional means and the present inventive apparatus and methods. At the MS's, successive or joint decoding can be utilized to resolve symbols transmitted through conventional and the inventive apparatus and methods.

Further variations of the basic method are also possible. In the method described above, the symbols for MS A is sent on the first time slot and the symbols for the MS B are sent on the second time. Alternatively, one can mix the symbols for the two MS's and transmit them all together in the same time slot. One such embodiment of the method is described in a later section.

Figure 4:
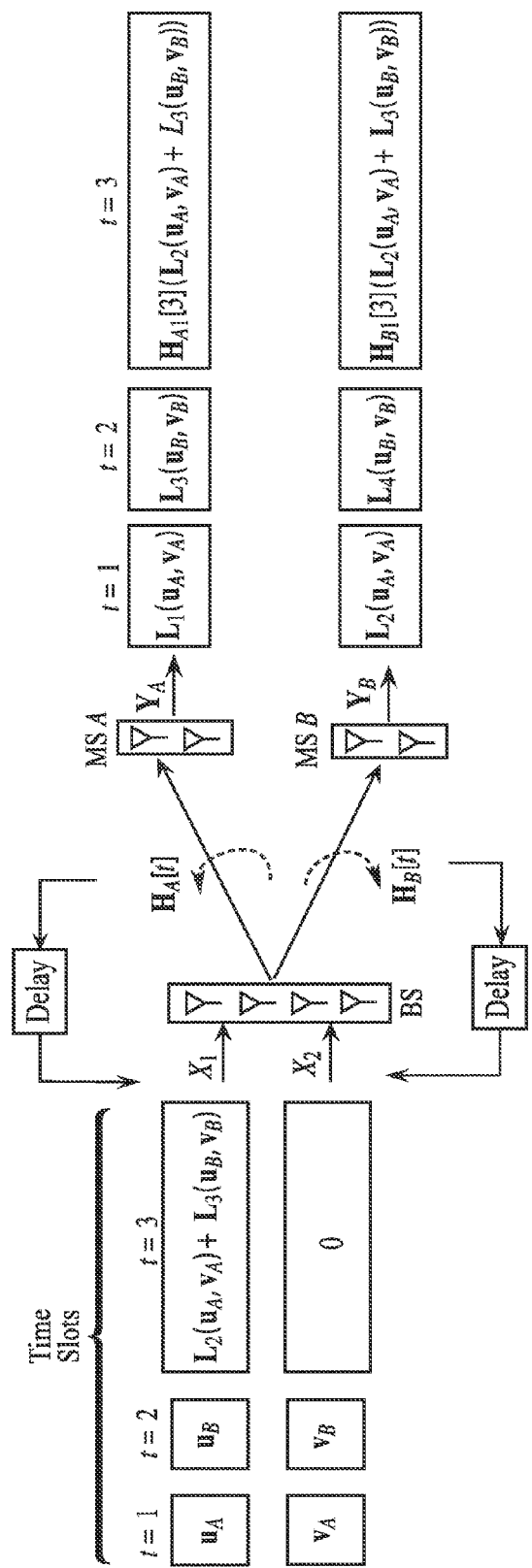
FIG. 4 is a schematic of an embodiment of the present invention utilizing four transmit antennas and two MS's each having two receive antennas.

FIG. 4 illustrates an example embodiment in which more than one antenna is utilized at each mobile station (MS). It should be appreciated that the preceding embodiments and methods can directly extend to the cases where there are more than one antenna at each MS. To exemplify this extension in a concrete way, with the figure elaborating on a counterpart of the preceding example for the case where there are four-antenna BS and two double-antenna MS's. Letting $u_A$, $v_A$, $w_A$, $z_A$ represent four symbols for MS A, and $u_B$, $v_B$, $w_B$, $z_B$ represent four symbols for MS B. In relation to FIG. 4, let the following be assumed, $$u_A = \begin{bmatrix} u_A \\ v_A \end{bmatrix}, v_A \begin{bmatrix} w_A \\ z_A \end{bmatrix}, u_B = \begin{bmatrix} u_B \\ v_B \end{bmatrix}, v_B = \begin{bmatrix} w_B \\ z_B \end{bmatrix},$$

$$L_1(u_A, v_A) = H_A[1]\begin{bmatrix} u_A \\ v_A \end{bmatrix}, L_2(u_A, v_A) = H_B[1]\begin{bmatrix} u_A \\ v_A \end{bmatrix},$$

$$L_3(u_B, v_B) = H_A[2]\begin{bmatrix} u_B \\ v_B \end{bmatrix}, L_4(u_B, v_B) = H_B[2]\begin{bmatrix} u_B \\ v_B \end{bmatrix}.$$

Using the method of FIG. 4, the BS can send 8 symbols over 3 time slots, or equivalently $$\frac{8}{3}$$

symbols per time slot.

1.2 Example 2

Three Transmit Antennas, Three Receiving Nodes

Figure 5:
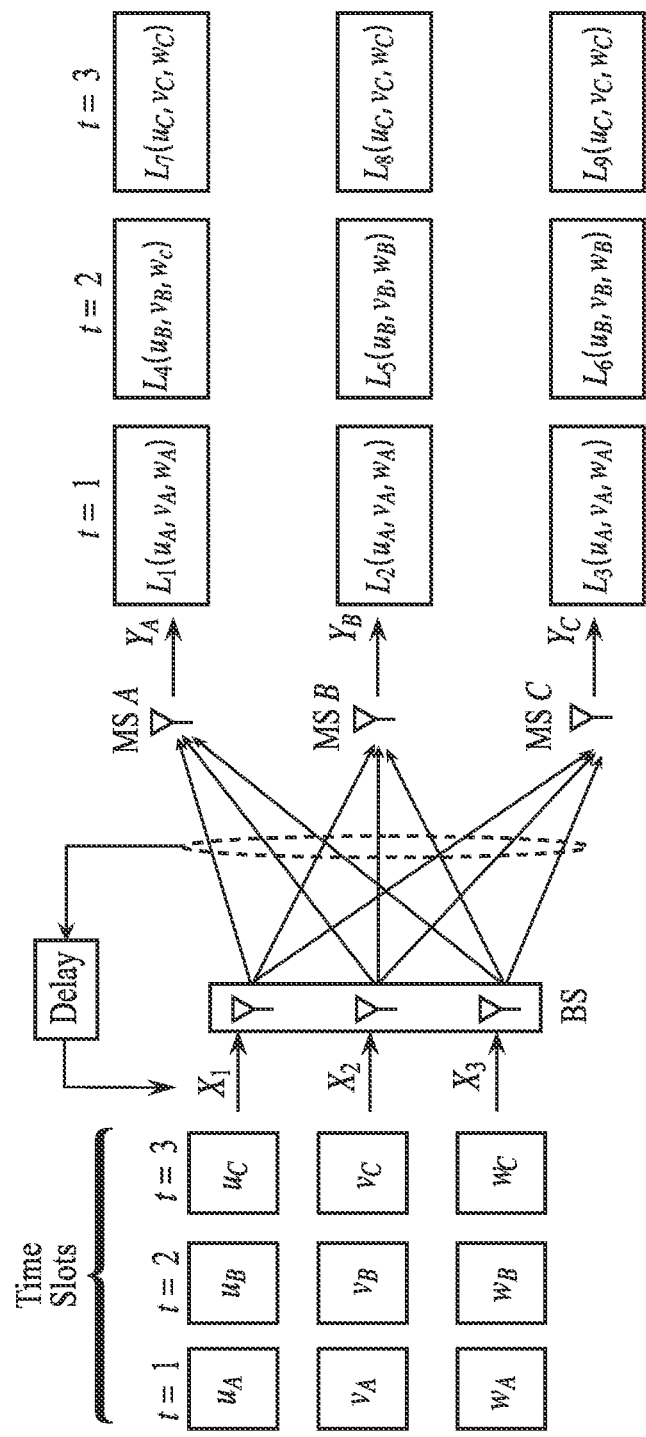
FIG. 5 is a schematic of an embodiment of a first phase of the present invention utilizing three transmit antennas and three MS's.
Figure 6:
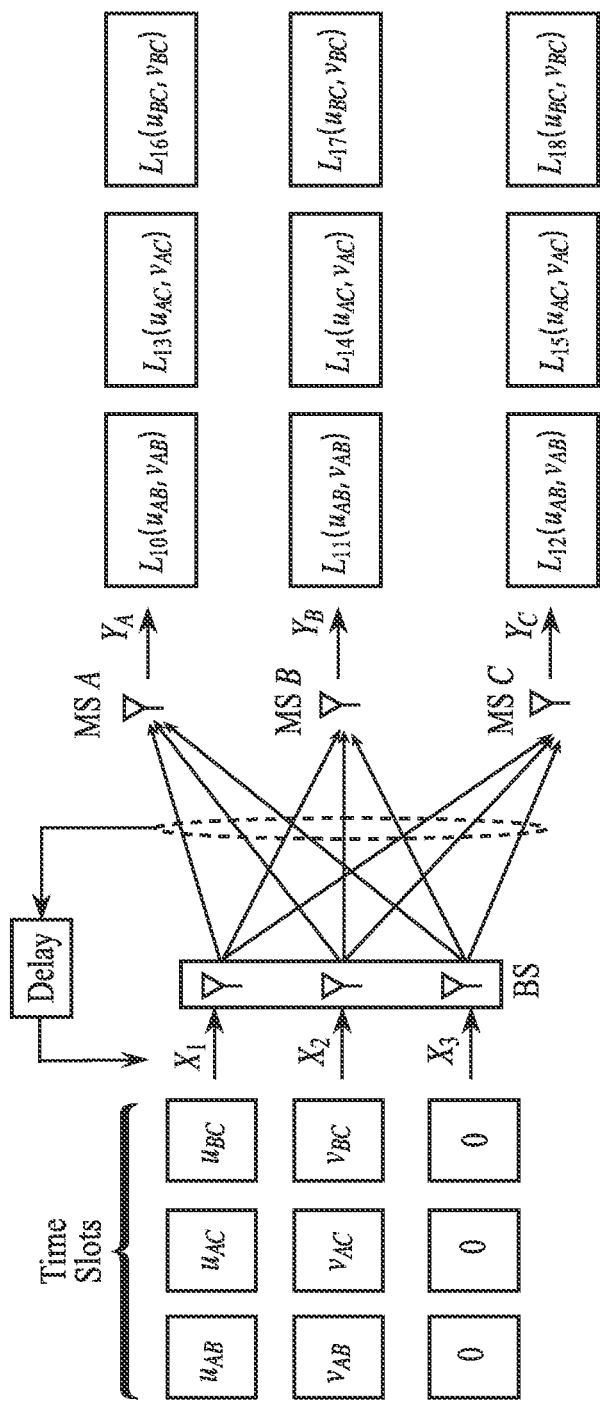
FIG. 6 is a schematic of an embodiment of a second phase of the present invention utilizing three transmit antennas and three MS's.

FIG. 5 and FIG. 6 illustrate an example utilizing a plurality of antennas at the BS communicating with a plurality of MS each having one antenna. This specific example is considered to utilize three MS's A, B and C, and three transmit antennas at the BS. In this configuration it is shown below that the BS can send 18 symbols over 11 time slots, or equivalently $$\frac{18}{11}$$

symbols per time slot. The achievable method has three phases.

Phase One: Assume that $u_r$, $v_r$, and $w_r$ represent three symbols for MS r, r=A, B, C.

Three symbols $u_A$, $v_A$, and $w_A$ are sent on the three transmit antennas in the first time slot. These symbols represent data for MS A. MS A receives a linear combination:

$$L_1(u_A,v_A,w_A)=h_{A1}[1]u_{A1}[1]u_A+h_{A2}[1]v_A+h_{A3}[1]w_A,$$

of the three symbols. Thus, the received signal at MS A is a superposition of the signals from the three transmit antennas, each of which is multiplied by the respective channel gain from that transmit antenna. Similarly, MS B and MS C receive other linear combinations:

$$L_2(u_A,v_A,w_A)=h_{B1}[1]u_A+h_{B2}[1]v_A+h_{B3}[1]w_A,$$

$$L_3(u_A,v_A,w_A)=h_{C1}[1]u_A+h_{C2}[1]v_A+h_{C3}[1]w_A.$$

As shown in FIG. 5, in the second time slot, three symbols $u_B$, $v_B$, and $w_B$ are sent on the three transmit antennas. These symbols represent data for MS. Each of the MS's A, B and C, receives a linear combination of the transmitted symbols, $$L_4(u_B,v_B,w_B)=h_{A2}[2]u_B+h_{A2}[2]v_B+h_{A3}[2]w_B,$$

$$L_5(u_B,v_B,w_B)=h_{B2}[2]u_B+h_{B2}[2]v_B+h_{B3}[2]w_B,$$

$$L_6(u_B,v_B,w_B)=h_{C2}[2]u_B+h_{C2}[2]v_B+h_{C3}[2]w_B.$$

Similarly, in the third time slot, three symbols $u_C$, $v_C$, and $w_C$ are sent on the three transmit antennas. These symbols represent data for MS C. Each of the MS's A, B and C, receives a linear combination of the transmitted symbols, $$L_7(u_C,v_C,w_C)=h_{A2}[3]u_C+h_{A2}[3]v_C+h_{A3}[3]w_C,$$

$$L_8(u_C,v_C,w_C)=h_{B2}[3]u_C+h_{B2}[3]v_C+h_{B3}[3]w_C,$$

$$L_9(u_C,v_C,w_C)=h_{C2}[3]u_C+h_{C2}[3]v_C+h_{C3}[3]w_C.$$

The following observations are made in view of the above.

If the linear combinations $L_2(u_A,v_A,w_A)$ and $L_3(u_A,v_A,w_A)$ can be delivered to MS A, then it has sufficient linear combinations to solve for $u_A$, $v_A$, and $w_A$.

If the linear combinations $L_4(u_B,v_B,w_B)$ and $L_6(u_B,v_B,w_B)$ can be delivered to MS B, then it has enough linear combinations to solve for $u_B$, $v_B$, and $w_B$.

If the linear combinations $L_7(u_C,v_C,w_C)$ and $L_8(u_C,v_C,w_C)$ can be delivered to MS C, then it has enough linear combinations to solve for $u_C$, $v_C$, and $w_C$.

The term $u_{AB}$ is defined herein as a linear combination of $L_2(u_A,v_A,w_A)$ and $L_4(u_B,v_B,w_B)$. To be specific in this example, this linear combination is defined as follows.

$$u_{AB}=L_2(u_A,v_A,w_A)+L_4(u_B,v_B,w_B).$$

Similarly, the following is defined:

$$u_{AC}=L_3(u_A,v_A,w_A)+L_7(u_C,v_C,w_C),$$

$$u_{BC}=L_6(u_B,v_B,w_B)+L_8(u_C,v_C,w_C).$$

Now, the following observations are made.

If $u_{AB}$ and $u_{AC}$ can be delivered to MS A, then it can use the linear combination $L_4(u_B,v_B,w_B)$ and $L_7(u_C,v_C,w_C)$ stored in memory to obtain $L_2(u_A,v_A,w_A)$ and $L_3(u_A,v_A,w_A)$. Therefore MS A can solve for $u_A$, $v_A$, $w_A$ (refer to previous observation).

If $u_{AB}$ and $u_{BC}$ can be delivered to MS B, then it can use the linear combination $L_2(u_A,v_A,w_A)$ and $L_8(u_C,v_C,w_C)$ stored in memory to obtain $L_4(u_B,v_B,w_B)$ and $L_6(u_B,v_B,w_B)$. Therefore MS B can solve for $u_B$, $v_B$, $w_B$.

If $u_{AC}$ and $u_{BC}$ can be delivered to MS C, then it can use the linear combination $L_3(u_A,v_A,w_A)$ and $L_6(u_B,v_B,w_B)$ stored in memory to obtain $L_7(u_C,v_C,w_C)$ and $L_8(u_C,v_C,w_C)$. Therefore MS C can solve for $u_C$, $v_C$, $w_C$.

To deliver $u_{AB}$ to MS's A and B, $u_{AC}$ to MS's A and C, and $u_{BC}$ to MS's B and C, one option is that BS transmits one of these symbols at the time. It is noted that space-time codes or any other diversity-improving schemes can be utilized to deliver $u_{AB}$, $u_{AC}$, and $u_{BC}$.

The other option is to go through the next phases as explained below.

Phase Two: Assume that $u_{AB}$ and $v_{AB}$ represent two symbols that are desired by both MS's A and B. Similarly, $u_{AC}$ and $v_{AC}$ are required by both MS's A and C, and $u_{BC}$ and $v_{BC}$ are required by both MS's B and C. It should be noticed that phase one generates only $u_{AB}$, $u_{AC}$, $u_{BC}$. To generate $v_{AB}$, $v_{AC}$, $v_{BC}$, phase one can be simply repeated twice with new input symbols. Phase two takes three time-slots. In first time-slot of the second phase, the transmitter sends linear combinations $u_{AB}$ and $v_{AB}$ from the transmit antennas. Here in this example, it is assumed that $u_{AB}$ and $v_{AB}$ are transmitted through the first and second transmit antennas. There are analogous transmissions in the second time slot for $u_{AC}$ and $v_{AC}$, and third time slot for $u_{BC}$ and $v_{BC}$. Details for the above are provided in relation to FIG. 6, description below.

In FIG. 6, the focus is on the first time-slot dedicated to both users at MS A and MS B, from which the following important observations arise.

If $L_{12}(u_{AB},v_{AB})$ is delivered to both MS's A and B, then both MS's have enough linear combinations to solve for $u_{AB}$ and $v_{AB}$.

If $L_{14}(u_{AC}, v_{AC})$ is delivered to both MS's A and C, then both MS's have enough linear combinations to solve for $u_{AB}$ and $v_{AB}$.

If $L_{16}(u_{BC},v_{BC})$ is delivered to both MS's B and C, then both MS's have enough linear combinations to solve for $u_{BC}$ and $v_{BC}$.

To deliver (i) $L_{12}(u_{AB}, v_{AB})$ to MS's A and B, (ii) $L_{14}(u_{AC},v_{AC})$ to MS's A and C, and (iii) $L_{16}(u_{BC},v_{BC})$ to MS's B and C, BS can send each of those symbols at the time. It is also possible to use any diversity scheme to improve the reliability of the transmission.

Another option is defining $u_{ABC}$ and $v_{ABC}$ as two linearly independent combinations of $L_{12}(u_{AB},v_{AB})$ and $L_{14}(u_{AC},v_{AC})$, and $L_{16}(u_{BC}, v_{BC})$, with:

$$u_{ABC}=\alpha_1 L_{12}(u_{AB},v_{AB})+\alpha_2 L_{14}(u_{AC},v_{AC})+\alpha_3 L_{16}(u_{BC},v_{BC}),$$

$$v_{ABC}=\beta_1 L_{12}(u_{AB},v_{AB})+\beta_2 L_{14}(u_{AC},v_{AC})+\beta_3 L_{16}(u_{BC},v_{BC}),$$

in which the constants $\alpha_i$ and $\beta_i$, i=1, 2, 3, have been shared with MS's. If $u_{ABC}$ and $v_{ABC}$ is delivered to MS A, then together with its saved linear combination $L_{16}(u_{BC},v_{BC})$, MS A has 3 linearly independent linear combinations to solve for $L_{12}(u_{AB},v_{AB})$ and $L_{14}(u_{AC},v_{AC})$. Then, it has enough linear combinations to solve for $u_{AB}$, $v_{AB}$, $u_{AC}$, and $v_{AC}$. A similar situation arises for MS's B and C. Therefore, it is enough to deliver $u_{ABC}$ and $v_{ABC}$ to all three MS's.

Phase Three: This phase is very simple. To deliver $u_{ABC}$ and $v_{ABC}$, the BS can send $u_{ABC}$ at the first time slot and $u_{ABC}$ at the second time slot. It can also use any diversity scheme such as Alamouti code to transmit these two symbols.

1.3 Example 3

Multiple Transmit Antennas, Multiple Receiving Nodes

This example focuses on the case with K-Antenna BS and K single-antenna MS's, referred as MS 1 to MS K, where K is greater than 1 but otherwise arbitrary. The embodiment of the method can deliver $$\frac{K}{1+\frac{1}{2}+\ldots+\frac{1}{K}}$$

symbols per time slot.

The method is based on a concatenation of K phases. Phase j takes symbols of order j (meaning that it is needed by j MS's simultaneously), and generates symbols of order j+1. For j=K, the phase is simple and generates no more symbols. For each j, phases j, j+1, . . . K can also be viewed together, as an embodiment of the method directed to delivering common symbols of order j to the receivers.

The $j^{th}$ phase takes $(K-j+1)K_j$ common symbols of order j, and yields $jK_{j+1}$ symbols of order j+1. This phase has $K_j$ time-slots, with each time-slot dedicated to a subset of receivers $\mathcal{S}$, $|\mathcal{S}|=j$. The time-slot dedicated to the subset $\mathcal{S}$ is denoted by $t_\mathcal{S}$. In this time-slot, the transmitter sends linear combinations of the K−j+1 symbols $u_{\mathcal{S},1}$, $u_{\mathcal{S},2}$, . . . , $u_{\mathcal{S},K-j+1}$, desired by all the MS's in $\mathcal{S}$. The transmitter utilizes K−j+1 of the transmit antennas.

The linear combination of the transmitted symbols received by MS r is denoted by $L_\mathcal{S}$. Focusing on the linear combinations of the transmitted symbols received by all MS's, in time-slot $t_\mathcal{S}$, the following observations are made.

For every $r \in \mathcal{S}$, the K−j+1 linear combinations consisting of one linear combination $L_{\mathcal{S},r}$ and the K−j linear combinations: $\{L_{\mathcal{S},r'} : r' \in \mathcal{E}\setminus\mathcal{S}\}$ are linearly independent linear combinations of the K−j+1 symbols $u_{\mathcal{S},1}$, $u_{\mathcal{S},2}$, . . . , $u_{\mathcal{S},K-j+1}$. This relies on the fact that the transmitter uses K−j+1 transmit antennas.

For any r, $r \in \mathcal{S}$, if the K−j linear combinations $\{L_{\mathcal{S},r'} : r' \in \mathcal{E}\setminus\mathcal{S}\}$ are somehow delivered to MS r, then MS r has K−j+1 linearly independent linear combinations to solve for all K−j+1 symbols $u_{\mathcal{S},1}$, $u_{\mathcal{S},2}$, . . . , $u_{\mathcal{S},K-j+1}$.

Having the above two observations, it can be said that the linear combination by MS r', $r' \in \mathcal{E}\setminus\mathcal{S}$ is simultaneously useful for all MS's in $\mathcal{S}$.

After repeating the above transmission for all $\mathcal{S}$, where $\mathcal{S} \subset \mathcal{E}$ and $|\mathcal{S}|=j$, then another important observation is made. Consider any subset $\mathcal{T}$ of MS's, where $|\mathcal{T}|=j+1$. Then each MS r, $r \in \mathcal{T}$, has an linear combination $L_{\mathcal{T}\setminus\{r\},r}$, which is simultaneously useful for all the MS's in $\mathcal{T}\setminus\{r\}$. It will be noted that the transmitter is aware of these linear combinations. For every $\mathcal{T} \subset \mathcal{E}$, $|\mathcal{T}|=j+1$, the transmitter forms j random linear combinations of $L_{\mathcal{T}\setminus\{r\},r}$, $r \in \mathcal{T}$, denoted by $u_{\mathcal{T},1}$, $u_{\mathcal{T},2}$, . . . , $u_{\mathcal{T},j}$. It is noted that $u_{\mathcal{T},\tau}$, $1 \leq \tau \leq j$, is simultaneously useful for all MS's in $\mathcal{T}$. Indeed, each r in $\mathcal{T}$, can subtract the contribution of $L_{\mathcal{T}\setminus\{r\},\tau}$ from $u_{\mathcal{T},\tau}$, $\tau=1,\ldots,j$, and form j linearly independent combinations of $L_{\mathcal{T}\setminus\{r\},\tau}$, $r \in \mathcal{T}\setminus\{r\}$. Using the above procedure, the transmitter generates $jK_{j+1}$ symbols of order j+1. The important observation is that if these $jK_{j+1}$ symbols are delivered to the designated MS's, then each MS will have enough linear combinations to solve for all of the original common symbols of order j.

It should be appreciated that following the same approach as in the first example, the method can be directly extended to the case where there are K MS's each with N antennas, and the base station has . . . antennas. Then, an embodiment of this method can send $$\frac{KN}{1+\frac{1}{2}+\ldots+\frac{1}{K}}$$

symbols per time slot.

It should also be noted that the above embodiment of the method can be shortened as follows. The above method can be concatenated for j=1 to j=s, where s is an integer between 1 and K. This concatenation generates some order j+1 symbols. Then the BS can send one symbols of order j+1 at a time slots.

Additionally, at each stage, any diversity-providing scheme can be added without departing from the invention, such as using space-time coding, to improve the reliability of the scheme.

It is also important to note that the symbols utilized in these methods can be coded or uncoded.

1.4 Example 4

Alternate Embodiments of Two Transmit Antennas, Two Receiving Nodes

Figure 7:
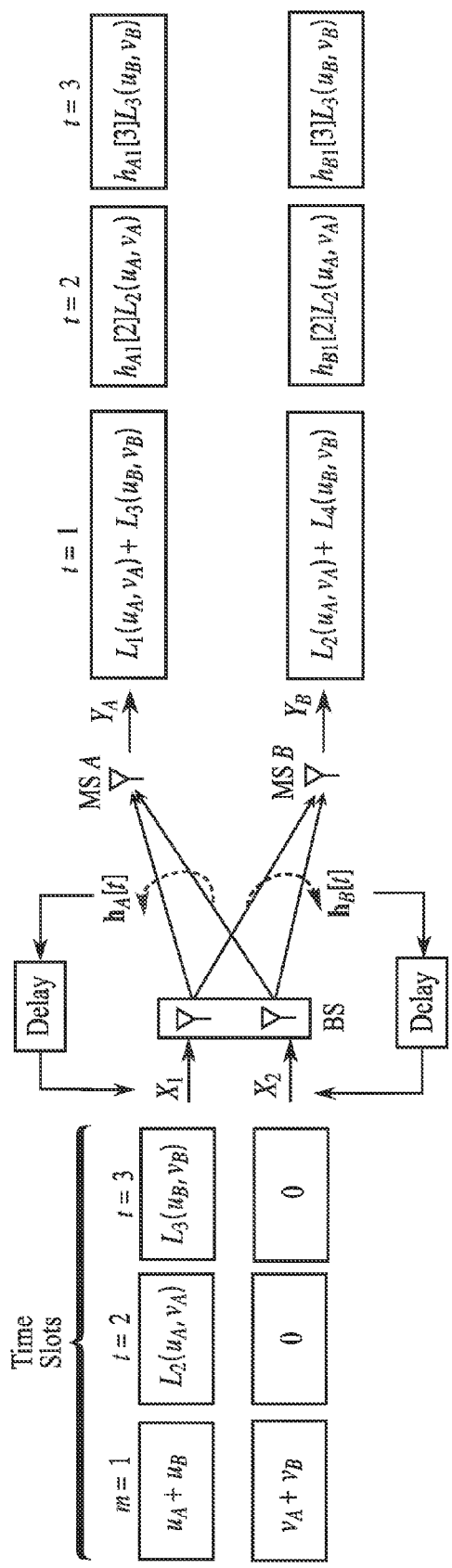
FIG. 7 is a schematic of an alternate embodiment of the present invention utilizing two transmit antennas and two MS's.

FIG. 7 illustrates an alternative example embodiment where the BS has two transmit antennas and there are two MS's A and B. Using this embodiment, the BS can send $$\frac{4}{3}$$

symbols per time slot.

Let $u_A$ and $v_A$ denote two symbols for MS A and $u_B$ and $v_B$ denote two symbols for MS B. In this method, BS transmits linear combinations of all of these four symbols from the two transmit antennas. To be specific, in this example, BS sends $u_A+u_B$ from the first transmit antenna, and $v_A+v_B$ from the second transmit antenna. Then, MS A receives, $$L_1(u_A,v_A)+L_3(u_B,v_B),$$

and MS B receives $$L_2(u_A,v_A)+L_4(u_B,v_B),$$

where $$L_1(u_A,v_A)=h_{A1}[1]u_A+h_{A2}[1]v_A$$

$$L_2(u_A,v_A)=h_{B1}[1]u_A+h_{B2}[1]v_A$$

$$L_3(u_B,v_B)=h_{A1}[1]u_B+h_{A2}[1]v_B$$

$$L_4(u_B,v_B)=h_{B1}[1]u_B+h_{B2}[1]v_B.$$

So far no channel gain information is used in the method. The delayed information about the channel gains during the first time transmission will be used by the BS for constructing the transmission on the second and third time slots.

In view of the above the following observations are made.

If the linear combinations $L_2(u_A,v_A)$ and $L_3(u_B,v_B)$ can be delivered to MS A, then it has enough linear combinations to solve for $u_A$ and $v_A$.

Similarly, if the linear combinations $L_2(u_A,v_A)$ and $L_3(u_B,v_B)$ can be delivered to MS B, then it has enough linear combinations to solve for $u_B$ and $v_B$.

Therefore $L_2(u_A,v_A)$ and $L_3(u_B,v_B)$ is needed by both MS's. Two time slots are utilized to deliver $L_2(u_A,v_A)$ and $L_3(u_B,v_B)$ to both MS's; for instance by sending one symbols per time.

1.5 Example 5

Two Transmit Antennas, Three Receiving Nodes

Figure 8:
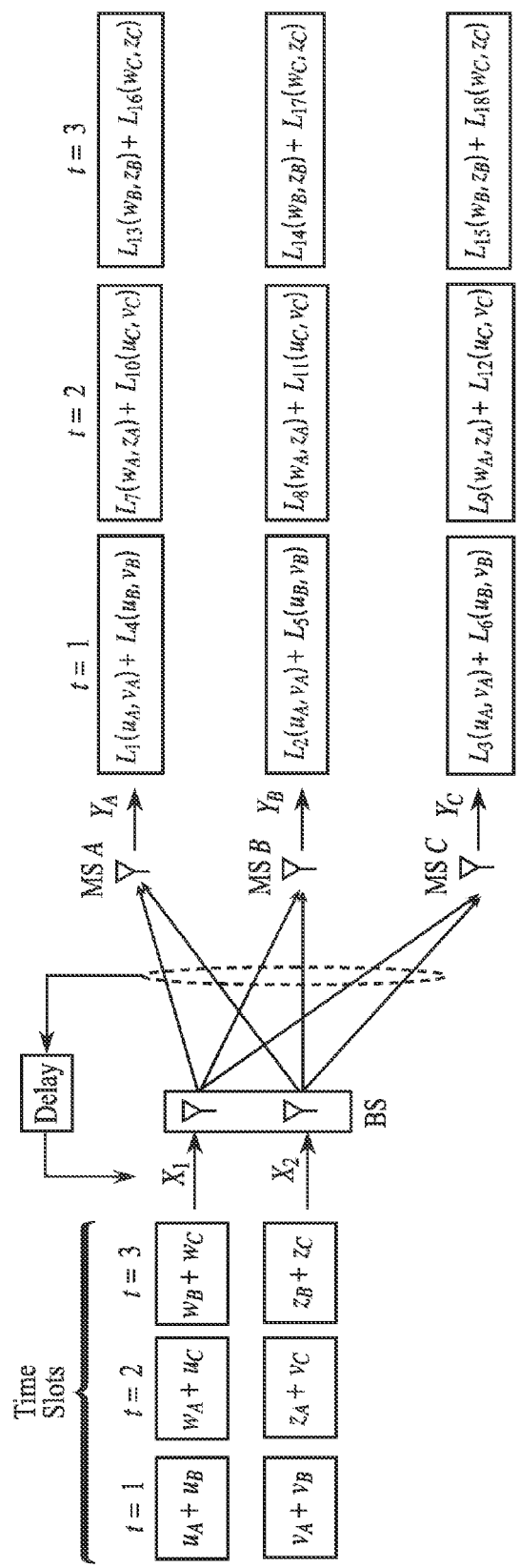
FIG. 8 is a schematic of an embodiment of a first phase of the present invention utilizing two transmit antennas and three MS's.

FIG. 8 illustrates an example embodiment of phase 1 for a configuration having two transmit antennas in a BS with three MS each having one antenna.

In this example, an embodiment is described in more detail of the method for a system having two-antenna BS and three single-antenna MS's. Let $u_i$, $v_i$, $w_i$, and $z_i$ denote four symbols for MS i, i=A, B, and C. The embodiment of the method has three phases.

For each MS to solve for all four desired symbols, it is enough that the following conditions be met:
MS A has $L_2(u_A,v_A)$, $L_4(u_B,v_B)$, $L_9(w_A,z_A)$, and $L_{10}(u_C,v_C)$.
MS B has $L_2(u_A,v_A)$, $L_4(u_B,v_B)$, $L_{15}(w_B,z_B)$, and $L_{17}(w_C,z_C)$.
MS C has $L_9(w_A,z_A)$, $L_{10}(u_C,v_C)$, $L_{15}(w_B,z_B)$, and $L_{17}(w_C,z_C)$.

Therefore, BS needs to deliver the following:
$L_2(u_A,v_A)$ and $L_4(u_B,v_B)$ to both MS A and MS B.
$L_9(w_A,z_A)$ and $L_{10}(u_C,v_C)$ to both MS A and MS C.
$L_{15}(w_B,z_B)$ and $L_{17}(w_C,z_C)$ to both MS B and MS C.

BS can send these 6 symbols one at a time, and therefore, it can send overall of 12 symbols over 9 time slots. The other option is as follows, whereby these three sets of values are defined:

$$u_{AB}=L_2(u_A,v_A), v_{AB}=L_4(u_B,v_B), \quad (1)$$

$$u_{AC}=L_9(w_A,z_A), v_{AC}L_{10}(u_C,v_C), \quad (2)$$

$$u_{BC}=L_{15}(w_B,z_B), v_{BC}=L_{17}(w_C,z_C). \quad (3)$$

Then the second and third phases of Example 3.2 can be uses to deliver these messages to the desired MSs.

1.6 Example 4

General Number of Transmit Antennas and Receiving Nodes

This example focuses on the case of an M-Antenna BS and K single-antenna MS's, referred as MS 1 to MS K.

The method is based on a concatenation of K phases. Phase j takes symbols of order j (meaning that it is needed by j MS's simultaneously), and generates symbols of order j+1. For j=K, the phase is simple and generates no more symbols. For each j, phases j, j+1, ... K can be viewed together, as a method whose object is to deliver common symbols of order j to the receivers.

Let $q_j$ be defined as $q_j=\min\{M-1,K-j\}$. In addition, $\alpha_j$ is defined as the largest common factor of $q_j$ and $K-j$. Phase j takes $$(K-j)\frac{q_j+1}{\alpha_j}K_j$$

symbols of order j and yields $$j\frac{q_j}{\alpha_j}K_{j+1}$$

messages with degree j+1.

Phase j has $K_j$ sub-phases, where each sub-phase is dedicated to a subset of the MS's $\mathcal{S}$, $|\mathcal{S}|=j$. The sub-phase dedicated to subset $\mathcal{S}$ is denoted by S-Ph($\mathcal{S}$). Each sub-phase takes $$\frac{K-j}{\alpha_j}$$

time-slots. In S-Ph($\mathcal{S}$), BS sends random linear combinations of $$\beta_j = \frac{(q_j+1)(K-j)}{\alpha_j}$$

symbols $u_{[\mathcal{S}],1}, u_{[\mathcal{S}],1}, \ldots, u_{[\mathcal{S}],1}$, desired by all MS's in $\mathcal{S}$. The BS uses at least $q_j+1$ of the transmit antennas. The linear combination of the transmitted symbols received by MS r, in the t-th time slot of S-Ph($\mathcal{S}$), is denoted by $L_{\mathcal{S},r}(t)$. Focus on the linear combinations of the transmitted symbols received by all MS's in S-Ph($\mathcal{S}$), the following observations are made.

For every $$r, r \in \mathcal{S}, \text{ and } t, t \in \left\{1, 2, \ldots, \frac{K-j}{\alpha_j}\right\},$$

the K−j+I linear combinations $\{L_{\mathcal{S},r'}(t), r' \in \{r\} \cup \mathcal{E} \setminus \mathcal{S}\}$ are not necessarily linearly independent. The reason is that $|\{r\} \cup \mathcal{E} \setminus \mathcal{S}|=K-j+1$, while the number of transmit antennas M can be less than K−j+1. Indeed, among the K−j linear combinations $L_{\mathcal{S},r'}(t), r' \in \{r\} \cup \mathcal{E} \setminus \mathcal{S}$, only $q_j$ linear combinations are found that are simultaneously useful to MS r, for any r in $\mathcal{S}$. Therefore, the $$\frac{(K-j)^2}{\alpha}$$

linear combinations in S-Ph($\mathcal{S}$) represents only $$\frac{q_j(K-j)}{\alpha}$$

linear combinations that are useful for any MS r, r∈$\mathcal{S}$.

Toward purifying the linear combinations MS r', r'∈$\mathcal{E}\backslash\mathcal{S}$, forms $$\frac{q_j}{\alpha_j}$$

linear combinations of $$L_{S,r'}(t), t = 1, \ldots, \frac{K-j}{\alpha}.$$

The resultant linear combinations are denoted by $$\hat{L}_{S,r'}(i), \hat{L}_{S,r'}(2), \ldots, \hat{L}_{S,r'}\left(\frac{q_j}{\alpha_j}\right).$$

It is easy to see that for every r, the following $$\frac{(q_j+1)(K-j)}{\alpha_j}$$

linear combinations are linearly independent:

$$L_{S,r}(t), t = 1, \ldots, \frac{K-j}{\alpha_j}, \text{ and}$$

$$\hat{L}_{S,r'}(t), r' \in \mathcal{E}\backslash\mathcal{S} \text{ and}$$

$$\hat{t} \in 1, \ldots, \frac{q_j}{\alpha_j}.$$

Therefore, if $$\hat{L}_{S,r'}(\hat{t}), r' \in \mathcal{E}\backslash\mathcal{S} \text{ and } \hat{t} \in 1, \ldots, \frac{q_j}{\alpha_j}$$

is given to user r, r∈$\mathcal{S}$, then it will have $$\beta_j = \frac{(q_j+1)(K-j)}{\alpha_j}$$

linearly independent linear combinations to solve for all desired variables $u_{S,1}, u_{S,2}, \ldots, u_{S,\beta_j}$.

In view of the above two observations, it can be said that the purified linear combinations by user r', r'∈$\mathcal{E}\backslash\mathcal{S}$, are simultaneously useful for all MS's in $\mathcal{S}$.

After repeating the above transmission for all $\mathcal{S}$, where $\mathcal{S} \subset \mathcal{E}$ and $|\mathcal{S}|=j$, then another important property arises. Consider a subset $\mathcal{T}$, of the MS's, where $|\mathcal{T}|=j+1$. Then each user r, r∈$\mathcal{T}$, has $$\frac{q_j}{\alpha_j}$$

purified linear combination $$\hat{L}_{\mathcal{T}\backslash\{r'\},r}(t), t = 1, \ldots, \frac{q_j}{\alpha_j}$$

which are simultaneity useful for all MS's in $\mathcal{T}\backslash\{r\}$. It should be noted that BS is aware of these purified linear combinations. For every $\mathcal{T} \subset \mathcal{T}$, $|\mathcal{E}|=j+1$, BS forms $$j\frac{q_j}{\alpha_j}$$

random linear combinations of $$\hat{L}_{\mathcal{T}\backslash\{r'\},r}(t), r \in \mathcal{T}, t = 1, \ldots, \frac{q_j}{\alpha_j},$$

denoted by $$u_{\mathcal{T},1}, u_{\mathcal{T},2}, \ldots, u_{\mathcal{T},j\frac{q_j}{\alpha_j}}.$$

It should also be noted that $$u_{\mathcal{T},\tau}, 1 \leq \tau \leq j\frac{q_j}{\alpha_j},$$

is simultaneously useful for all MS's in $\mathcal{T}$. Indeed, each user r, r∈$\mathcal{T}$, can subtract the contributions of $$\hat{L}_{\mathcal{T}\backslash\{r'\},r}(t), t = 1, \ldots, \frac{q_j}{\alpha_j}$$

from $$u_{\mathcal{T},\tau}, \tau = 1, \ldots, j\frac{q_j}{\alpha_j},$$

and form $$j\frac{q_j}{\alpha_j}$$

linearly independent combinations of $$\hat{L}_{\mathcal{T}\backslash\{r'\},r'}(t), r' \in \mathcal{T}\backslash\{r\}, t = 1, \ldots, \frac{q_j}{\alpha_j}.$$

Using the above procedure, BS forms $$j\frac{q_j}{\alpha_j}K_{j+1}$$

symbols with degree j+1. The important observation is if these $$j\frac{q_j}{\alpha_j}K_{j+1}$$

symbols are delivered to the designated MS's, then each receivers will have enough linear combinations to resolve all designated messages with degree j.

1.7 General Method Description

Figure 9:
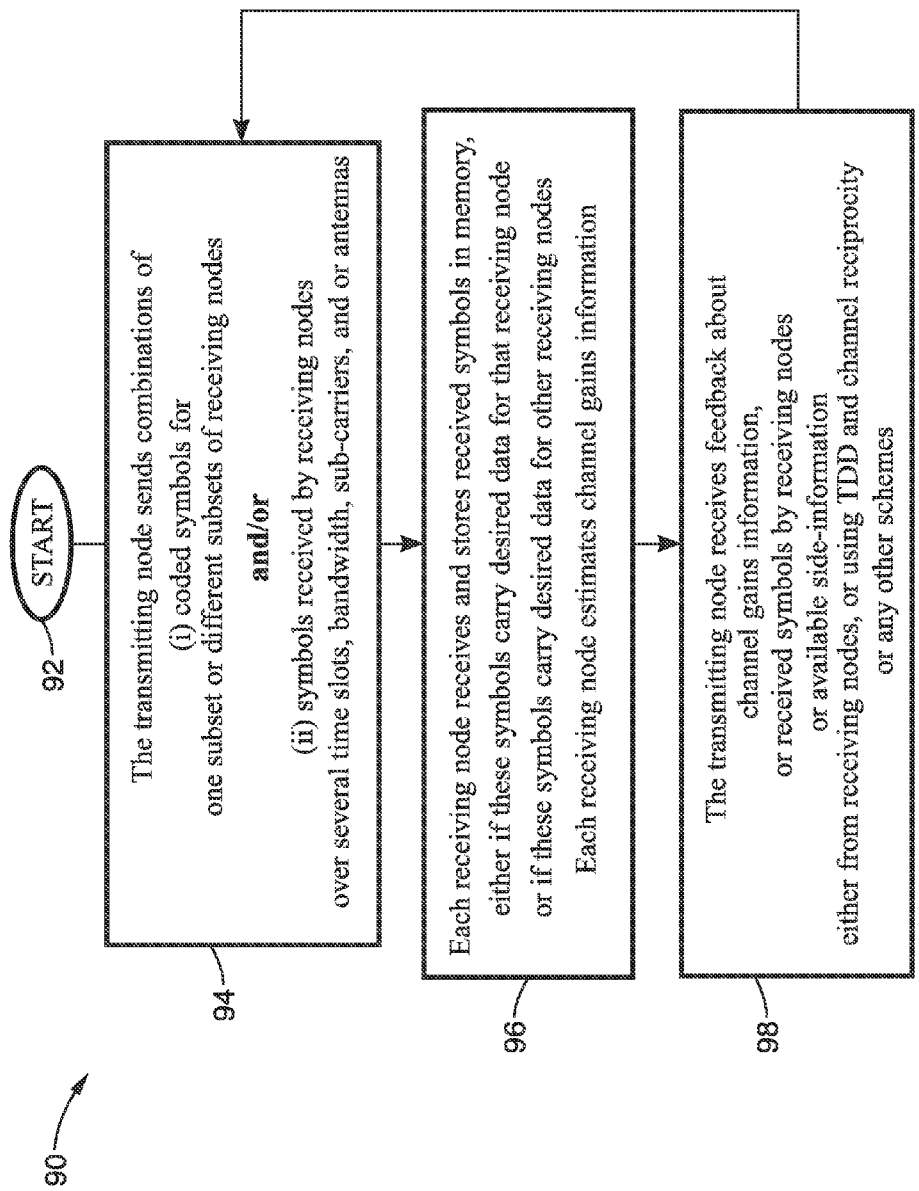
FIG. 9 is a flow diagram of processing steps for throughput enhancement based on delayed channel gain information according to an embodiment of the present invention.

FIG. 9 illustrates an embodiment 90 of a wireless communication throughput enhancement based on delayed channel gain information, shown in a generalized form.

As can be seen in the numerous previous examples, there are many variations of the basic method that can be implemented without departing from the teachings of the present invention. Instead of using delayed channel measurements to predict the current channel gains as in many current state-of-the-art approaches, the information is utilized for determining the linear combinations of the symbols transmitted from the transmitting nodes' multiple antennas that were received at the various receiving nodes in previous transmissions. This information is then used to design future transmissions that can simultaneously benefit multiple receiving nodes, thus improving the system throughput. Each receiving node can make use of these transmissions by combining them with what it has already received.

Future transmissions are a recombination of symbols that have already been transmitted and potentially new symbols as well. The recombination depends on the previously received information at the receiving nodes and hence on the delayed channel measurements. The combination can be linear or it can be non-linear. To create transmissions that can benefit more and more receiving nodes simultaneously, the method may have to go through multiple stages. At each stage, information about the previously received linear combinations at the receiving nodes are used to create transmissions. The number of stages depends on the number of receiving nodes and the number of transmit antennas.

The method is shown commencing at block 92 and at block 94 the transmitting node determines and sends combinations of (i) coded symbols for one subset or different subsets of receiving nodes; (ii) symbols received by receiving nodes over several time slots, bandwidth, sub-carriers, and/or antennas; (iii) or both.

Block 96 depicts that each receiving node receives and stores received symbols in memory, either if these symbols carry desired data for that receiving node or if these symbols carry desired data for other receiving nodes. Each of these receiving nodes estimates the channel gain information.

At block 98 the transmitting node receives feedback about channel gain information, or received symbols by receiving nodes, or the available side-information either from receiving nodes, or using TDD and channel reciprocity or other similar mechanisms.

Figure 10:
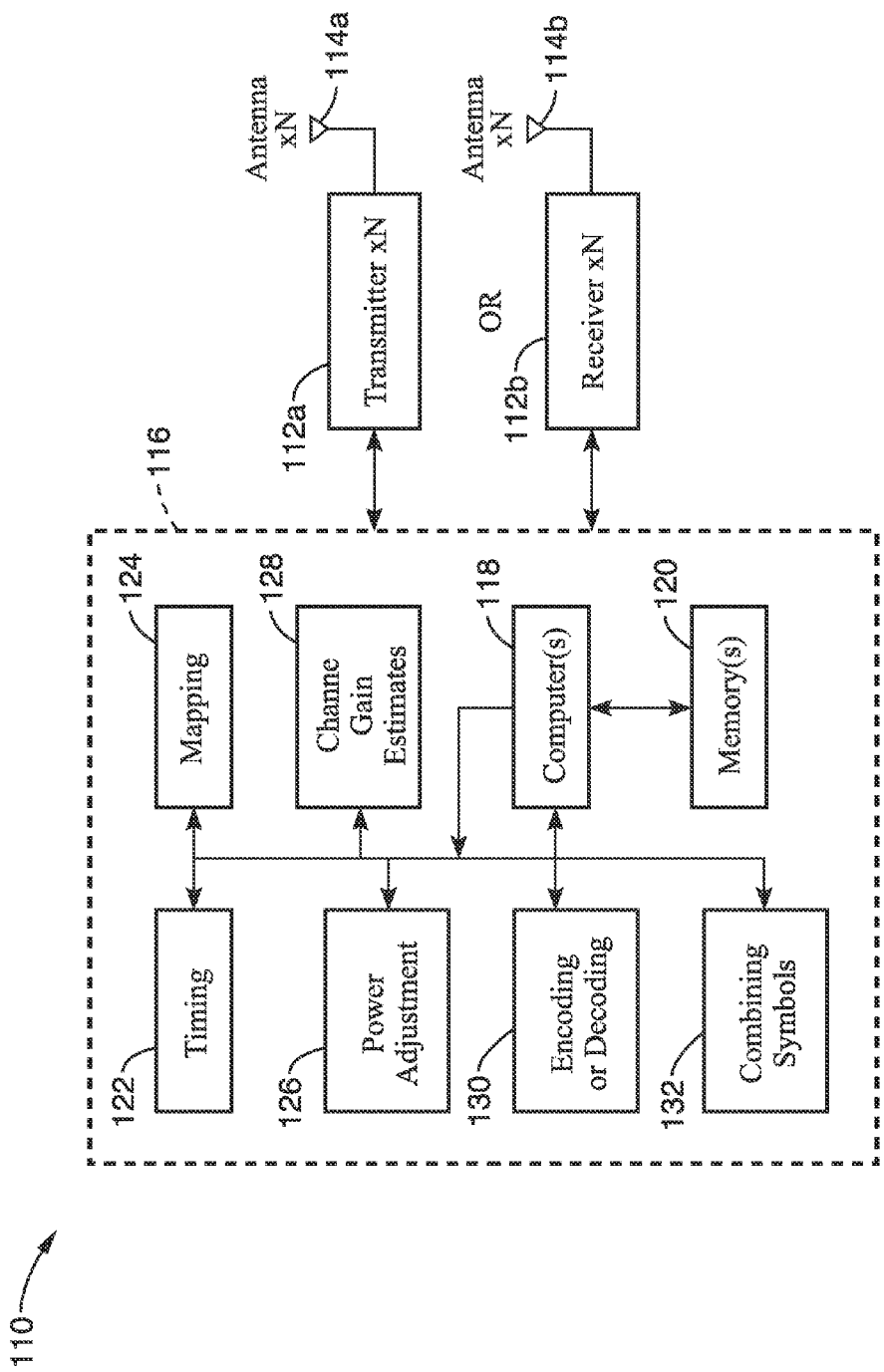
FIG. 10 is a block diagram of an apparatus configured according to an embodiment of the present invention, showing executable programming for carrying out the steps of the invention.

FIG. 10 illustrates an apparatus embodiment 110 of the present invention configured for providing enhanced throughput for multiple transmissions based on delayed channel gain information. The multiple transmissions can be configured from multiple transmitters 112a (physical transmitter e.g., Radio Frequency) each with a single antenna 114a, or a single transmitter 112a with multiple antenna 114a. Operation at the receivers operates similarly, receiving at multiple receivers 112b each having one or more antenna 114b. The communication apparatus, base station or transmitter control portion 116, is configured with at least one computer 118 and at least one memory 120. Programming from memory 120 is executed on computer 118 in performing the steps of the present invention. Elements of the apparatus perform timing 122 of time slots and maintaining synchronization, mapping of symbols 124, optional power adjustments 126, such as within a power constraint, determining channel gain estimates 128, encoding or decoding 130, and the combining of symbols 132.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

From the discussion above it will be appreciated that the invention can be embodied in various ways, including the following:

1. An apparatus for wireless transmission, comprising: a transmitting node having at least two antennas, or at least two transmitting nodes having at least one antenna on each transmitting node, configured for wirelessly communicating with one or more receiving nodes each having one or more antennas; at least one computer processor in said transmitting node, or nodes; and programming executable on said at least one computer processor for: transmitting symbols for receipt by the one or more receiving nodes; utilizing delayed channel-gain information to determine the combinations of symbols received by the one or more receiving nodes in previous transmissions; and configuring future transmissions as recombinations of already transmitted symbols in response to information of past received combinations.

2. The apparatus of embodiment 1, wherein said programming executable on said at least one computer is further configured for sending new coded symbols in conjunction with already transmitted symbols.

3. The apparatus of embodiment 1, wherein said symbols are uncoded symbols or coded symbols.

4. The apparatus of embodiment 1, wherein said programming executable on said at least one computer is configured for coding said symbols prior to transmission to one or more receiving nodes.

5. The apparatus of embodiment 1, wherein said programming executable on said at least one computer processor is configured for utilizing said delayed channel-gain information for configuring future transmissions as linear or non-linear recombinations of already transmitted symbols in response to information of past received combinations.

6. The apparatus of embodiment 1, wherein said transmitting node comprises a base station (BS).

7. The apparatus of embodiment 1, wherein the one or more receiving nodes comprise mobile stations (MS).

8. The apparatus of embodiment 1, wherein utilizing delayed channel-gain information to determine the combinations of symbols received by the one or more receiving nodes increases symbol throughput of said wireless transmission apparatus.

9. The apparatus of embodiment 1, wherein channel gain comprises a complex number as a base band representation of the channel.

10. The apparatus of embodiment 1, wherein said symbols are scaled to meet a power constraint.

11. The apparatus of embodiment 1, wherein a signal received at the one or more receiving nodes is the sum of the symbols transmitted at the one or more antennas multiplied by the corresponding channel gains.

12. An apparatus for wireless reception, comprising: a first receiving node having at least one antenna configured for wirelessly communicating with at least one transmitting node; wherein said first receiving node is one of multiple receiving nodes; at least one computer processor in said first receiving node; and programming executable on said at least one computer processor for: determining channel gain information and communicating to the transmitting node; and decoding the combination of symbols at said first receiving node which were combined in response to delayed channel gain information received by one of multiple receiving nodes in previous transmissions.

13. The apparatus of embodiment 12, wherein said symbols are uncoded symbols or coded symbols.

14. The apparatus of embodiment 12, wherein the combination of symbols was formed at the at least one transmitter node utilizing said delayed channel-gain information for configuring future transmissions as linear or non-linear recombinations of already transmitted symbols in response to information of past received combinations.

15. The apparatus of embodiment 12, wherein said receiving node comprises a mobile station (MS).

16. The apparatus of embodiment 12, wherein the transmitting node comprises a base station (BS).

17. The apparatus of embodiment 12, wherein channel gain comprises a complex number as a base band representation of the channel.

18. The apparatus of embodiment 12, wherein signal received at said first receiving node is a sum of the symbols transmitted in the at least one transmitting node multiplied by the corresponding channel gains.

19. A method of wireless communication between multiple transmit antennas and multiple receive antennas, comprising: a transmitting node having at least two antennas, or at least two transmitting nodes each having at least one antenna; at least two receiving nodes, each having at least one antenna; wherein said transmitting node, or nodes, and said receiving nodes are configured for wirelessly communicating with one another; transmitting symbols from said transmitting node, or nodes, for receipt by the one or more receiving nodes; utilizing delayed channel-gain information to determine the combinations of symbols received by the one or more receiving nodes in previous transmissions; and configuring future transmissions of said transmitting node, or nodes, as a recombination of already transmitted symbols in response to information from past received combinations; determining channel gain information at said at least two receiving nodes and communicating said channel gain information to said at least two transmitting nodes; and decoding the combination of symbols at said at least two receiving nodes which were combined in response to delayed channel gain information in previous transmissions.

20. The method of embodiment 19, wherein said symbols are uncoded symbols or coded symbols.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for wireless transmission, comprising:
a transmitting node having at least two antennas, or at least two transmitting nodes having at least one antenna on each transmitting node, configured for wirelessly communicating with one or more receiving nodes each having one or more antennas;

at least one computer processor in said transmitting node, or nodes; and programming executable on said at least one computer processor for:

transmitting symbols for receipt by the one or more receiving nodes;

utilizing delayed channel-gain information to determine the combinations of symbols received by the one or more receiving nodes in previous transmissions; and configuring future transmissions as recombinations of already transmitted symbols in response to information of past received combinations.

2. The apparatus as recited in claim 1, wherein said programming executable on said at least one computer is further configured for sending new coded symbols in conjunction with already transmitted symbols.

3. The apparatus as recited in claim 1, wherein said symbols are uncoded symbols or coded symbols.

4. The apparatus as recited in claim 1, wherein said programming executable on said at least one computer is configured for coding said symbols prior to transmission to one or more receiving nodes.

5. The apparatus as recited in claim 1, wherein said programming executable on said at least one computer processor is configured for utilizing said delayed channel-gain information for configuring future transmissions as linear or non-linear recombinations of already transmitted symbols in response to information of past received combinations.

6. The apparatus as recited in claim 1, wherein each said transmitting node comprises a base station (BS).

7. The apparatus as recited in claim 1, wherein the one or more receiving nodes comprise mobile stations (MS).

8. The apparatus as recited in claim 1, wherein utilizing delayed channel-gain information to determine combinations of symbols received by the one or more receiving nodes increases symbol throughput of said wireless transmission apparatus.

9. The apparatus as recited in claim 1, wherein channel gain comprises a complex number as a base band representation of the channel.

10. The apparatus as recited in claim 1, wherein said symbols are scaled to meet a power constraint.

11. The apparatus as recited in claim 1, wherein a signal received at the one or more receiving nodes is the sum of the symbols transmitted at the one or more antennas multiplied by the corresponding channel gains.

12. An apparatus for wireless reception, comprising:
a first receiving node having at least one antenna configured for wirelessly communicating with at least one transmitting node;
wherein said first receiving node is one of multiple receiving nodes;
at least one computer processor in said first receiving node; and
programming executable on said at least one computer processor for:
determining channel gain information and communicating to the transmitting node; and
decoding the combination of symbols at said first receiving node which were combined in response to delayed channel gain information received by one of multiple receiving nodes in previous transmissions.

13. The apparatus as recited in claim 12, wherein said symbols are uncoded symbols or coded symbols.

14. The apparatus as recited in claim 12, wherein the combination of symbols was formed at the at least one transmitter node utilizing said delayed channel-gain information for configuring future transmissions as linear or non-linear recombinations of already transmitted symbols in response to information of past received combinations.

15. The apparatus as recited in claim 12, wherein said first receiving node comprises a mobile station (MS).

16. The apparatus as recited in claim 12, wherein the transmitting node comprises a base station (BS).

17. The apparatus as recited in claim 12, wherein channel gain comprises a complex number as a base band representation of the channel.

18. The apparatus as recited in claim 12, wherein signal received at said first receiving node is a sum of the symbols transmitted in the at least one transmitting node multiplied by the corresponding channel gains.

19. A method of wireless communication between multiple transmit antennas and multiple receive antennas, comprising:
a transmitting node having at least two antennas, or at least two transmitting nodes each having at least one antenna;
at least two receiving nodes, each having at least one antenna;
wherein said transmitting node, or nodes, and said receiving nodes are configured for wirelessly communicating with one another;
transmitting symbols from said transmitting node, or nodes, for receipt by the at least two receiving nodes;
utilizing delayed channel-gain information to determine the combinations of symbols received by the at least two receiving nodes in previous transmissions; and
configuring future transmissions of said transmitting node, or nodes, as a recombination of already transmitted symbols in response to information from past received combinations;
determining channel gain information at said at least two receiving nodes and communicating said channel gain information to said transmitting node, or nodes; and
decoding the combination of symbols at said at least two receiving nodes which were combined in response to delayed channel gain information in previous transmissions.

20. The method as recited in claim 19, wherein said symbols are uncoded symbols or coded symbols.

* * * * *